US012654861B2

(12) United States Patent  
Seibel et al.

(10) Patent No.: US 12,654,861 B2  
(45) Date of Patent: Jun. 16, 2026

(54) ADJUSTABLE POCKET FOR AIRCRAFT SIDEWALL

(71) Applicant: Textron Aviation Inc., Wichita, KS (US)

(72) Inventors: Michael John Seibel, Wichita, KS (US); Chad Lee Smith, Andale, KS (US); Craig Louis Bothell, Wichita, KS (US); Emily O'Kelley Pearson, Laramie, WY (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/830,543

(22) Filed: Sep. 10, 2024

(65) Prior Publication Data

US 2025/0091717 A1 Mar. 20, 2025

Related U.S. Application Data

(60) Provisional application No. 63/583,889, filed on Sep. 20, 2023.

(51) Int. Cl.  
B64D 11/00 (2006.01)

(52) U.S. Cl.  
CPC ................................. B64D 11/003 (2013.01)

(58) Field of Classification Search  
CPC .. B60R 7/00; B60R 7/005; B60R 7/02; B60R 7/081  
See application file for complete search history.

(56) References Cited

U.S. PATENT DOCUMENTS

| | | | |
|---|---|---|---|
| 9,216,695 B2 | 12/2015 | Gagnier | |
| 9,511,862 B2 | 12/2016 | Thiele et al. | |
| 9,919,802 B2 | 3/2018 | Stephens et al. | |
| 10,059,270 B1 * | 8/2018 | Gawade | B60R 7/005 |
| 11,124,299 B2 * | 9/2021 | McKee | B64D 11/0624 |
| 2006/0102667 A1 * | 5/2006 | Padilla | A45C 5/045 |
| | | | 224/153 |
| 2010/0123327 A1 | 5/2010 | Fitzpatrick | |
| 2013/0327800 A1 | 12/2013 | Xu | |
| 2017/0274745 A1 * | 9/2017 | Lewis | B60R 7/02 |
| 2018/0201196 A1 * | 7/2018 | Hellman | B60Q 3/233 |
| 2022/0095799 A1 * | 3/2022 | Hong | B60R 7/005 |

* cited by examiner

*Primary Examiner* — Joshua J Michener  
*Assistant Examiner* — Cindi M Curry  
(74) *Attorney, Agent, or Firm* — Avek IP, LLC

(57) ABSTRACT

A repositionable pocket for an aircraft having a rigid pocket wall pivotally attached to the aircraft sidewall and at least one strap assembly connecting the pocket to the sidewall. The strap assembly has a first end fixable to the sidewall and a second end repositionably fastened to the pocket. The strap is preferably made to be elastic and urges the attached pocket into a closed orientation thereby securing any stowed items between the pocket and the aircraft sidewall. Strap adjustability accommodates different sized objects for stowage.

19 Claims, 8 Drawing Sheets

ADJUSTABLE POCKET FOR AIRCRAFT SIDEWALL

CROSS-REFERENCE TO RELATED APPLICATIONS

This application claims the benefit of U.S. Provisional Patent Application No. 63/583,889, filed Sep. 20, 2023, the entire contents thereof are herein incorporated by reference.

BACKGROUND

1. Field

This invention relates generally to the field of vehicle side pockets for storage. More specifically, the embodiments relate to an expandable storage pocket with adjustable tension for attachment to an airplane interior sidewall.

2. Description of the Related Art

It is known to have storage compartments for passengers on an aircraft. For instance, U.S. Pat. No. 9,919,802 to Stephens et al. discloses a flexible storage compartment for a passenger which can open. U.S. Pat. No. 9,511,862 to Thiele et al. discloses a holding device for an aircraft seat configured to hold a personal electronic device.

It is also known to have adjustable storage compartments for vehicles. For instance, U.S. Pat. No. 9,216,695 to Gagnier discloses storage pockets arranged on a seat which can be adjusted. U.S. Patent Publication No. 2010/0123327 to Fitzpatrick discloses a stowage device which is adjustable to accommodate different size items. Fitzpatrick discloses a moveable panel allows for the storage compartment to be adjustable

SUMMARY

In some embodiments, the techniques described herein relate to an adjustable pocket for mounting on an interior panel of an aircraft including: a pocket having an upper edge and lower edge, and opposing sides disposed therebetween; a hinge pivotally connecting the lower edge of the pocket to the interior panel; and a strap assembly including at least one strap having a first end fixed to the interior panel and a second end attached to the pocket wherein the strap assembly is configured to impart tension to bias the pocket into a closed position; the second end being repositionable such that tension imparted to the pocket is adjustable.

In some embodiments, the techniques described herein relate to a pocket further including a reinforced portion fixed to the first end of the strap assembly.

In some embodiments, the techniques described herein relate to a pocket wherein the reinforced portion includes Kydex.

In some embodiments, the techniques described herein relate to a pocket wherein the strap assembly includes stretchable material.

In some embodiments, the techniques described herein relate to a pocket wherein the stretchable material is elastic.

In some embodiments, the techniques described herein relate to a pocket wherein the strap passes through a guide slot formed in the interior panel and the first end is fixed to the interior panel and the second end attaches to the pocket.

In some embodiments, the techniques described herein relate to a pocket further including at least two strap assemblies with one such strap assembly provided at each of the opposing sides of the pocket.

In some embodiments, the techniques described herein relate to a pocket further including connection means to repositionably fasten the second end of the strap assembly to the pocket.

In some embodiments, the techniques described herein relate to a pocket wherein the connection means includes a hook and loop fastener.

In some embodiments, the techniques described herein relate to a pocket wherein the connection means allows the strap assembly to be detachable from the pocket such that the pocket can be expanded or removed from the interior panel.

In some embodiments, the techniques described herein relate to a pocket wherein the pocket includes corner retainers configured into upper corners of the pocket, and the corner retainers align and guide the strap assembly.

In some embodiments, the techniques described herein relate to a pocket wherein the strap assembly is concealed within the pocket and attaches to an inner surface of the pocket.

In some embodiments, the techniques described herein relate to an adjustable pocket for mounting on an interior panel of an aircraft including: a pocket shell including a front wall connected to opposing sides; a strap having a first end and a second end, wherein the first end is fixed to the interior panel and the second end is repositionably attached to the pocket shell; the strap being configured to impart tension onto the pocket shell and bias the pocket shell into a closed position, wherein the tension imparted is adjustable when the second end is repositioned.

In some embodiments, the techniques described herein relate to a pocket wherein the opposing sides are aligned with flanges extending outwards from the interior panel.

In some embodiments, the techniques described herein relate to a pocket wherein a first fastening fabric is disposed on the pocket shell and a second fastening fabric is disposed on the strap, and, when joined, the first fastening fabric and second fastening fabric make the strap repositionably secure with the pocket.

In some embodiments, the techniques described herein relate to a pocket wherein the strap passes through a corner retainer and the corner retainer alters the direction of pull when the pocket is biased into an open position.

In some embodiments, the techniques described herein relate to a pocket for an aircraft interior surface, the pocket including: a shell including opposing side walls, a front wall, and a floor; a hinge on the aircraft interior surface; a lower portion of the shell being mounted on the hinge, allowing for rotation of the shell upwardly and inwardly and outwardly and downwardly relative to the interior surface; an elastic length-adjustable strap system, the length-adjustable strap system being anchored at first opposing ends to different locations into the aircraft interior surface, the length-adjustable strap system being wrapped around an internal containment system included on an inside of the shell, the internal containment system being concealed by the shell, the internal containment system receiving the strap such that the shell is compelled towards the aircraft interior surface.

In some embodiments, the techniques described herein relate to a pocket wherein second opposing ends of the elastic length-adjustable strap system have elasticity and the second opposing ends are connected together by a locking band that spans between the second opposing ends.

In some embodiments, the techniques described herein relate to a pocket wherein the second opposing ends are connected to the locking band and removable using hook and loop materials.

In some embodiments, the techniques described herein relate to a pocket wherein the hinge mounts to a floor of the shell and the aircraft interior surface.

DETAILED DESCRIPTION OF THE INVENTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Cargo or storage pockets for vehicle or aircraft interiors are highly desirable and functionable. Some known storage pockets provided in aircraft have typically consisted of a pouch with elastic at or near the upper access to provide limited tension to capture items placed within the pouch. Disadvantageously, however, these elastic storage pockets sag over time and the elastic suffers fatigue which decreases the imparted tension. Such pockets are also without means for adjustment and easy re-tensioning after fatigue. Moreover, known elastic storage pockets are not adjustable and can be difficult to clean. The positioning of the storage pocket must accommodate fuselage integrity and can be limited by the configuration of attachment points and structural component placement.

Advantageously, the disclosed embodiments can overcome the limitations that are present in the known elastic pocket devices. This summary below is intended to provide a simplified overview of the invention for a general understanding of the concepts, structure and functions of the disclosed device.

Figure 1:
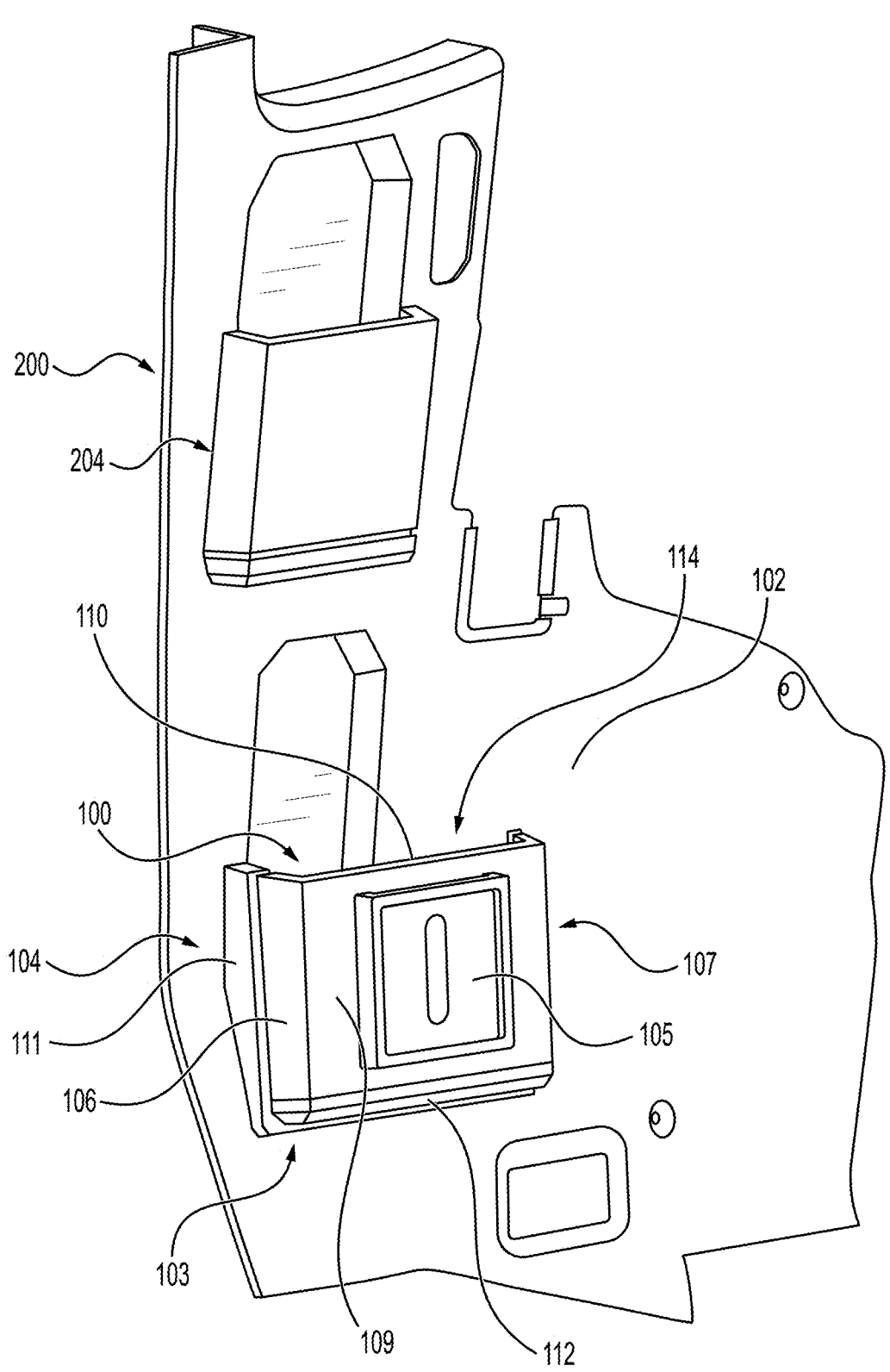
FIG. 1 is a perspective view of an adjustable pocket in embodiments.
Figure 2:
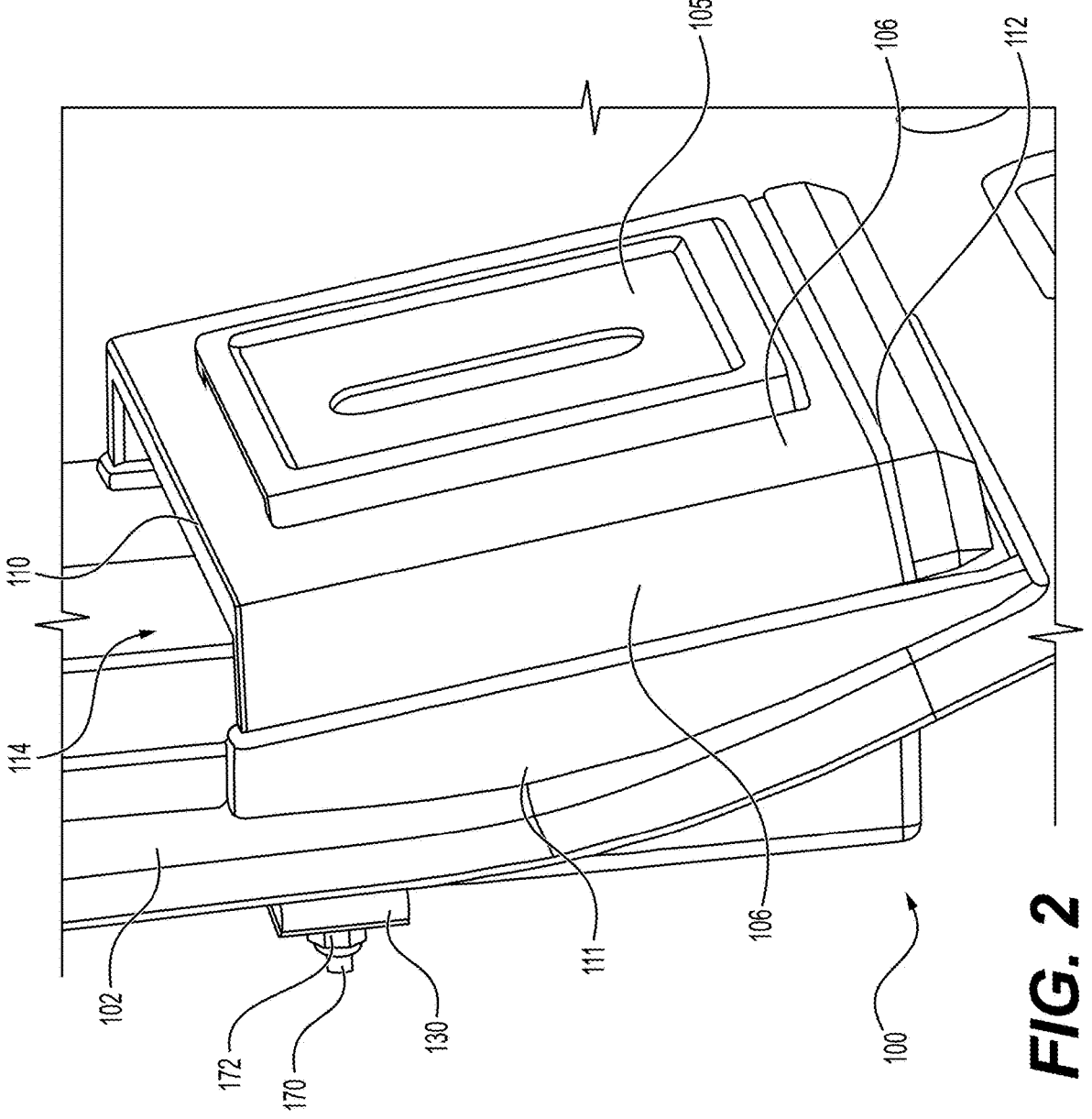
FIG. 2 is a close-up perspective view of the adjustable pocket of FIG. 1.

The disclosed embodiments are directed to an adjustable side pocket arrangement for attachment to locations on the interior sidewall panel 102 of an aircraft. In the disclosed embodiments, with reference to FIG. 1, two pockets—a lower pocket 100 and an upper pocket 200—are shown. In other embodiments, however, only one pocket might be utilized and in yet other embodiments more than two pockets may be utilized, both of which would still fall within the scope of the disclosed embodiments. The following description relates to pocket 100. Pocket 200 includes substantially the same components as the pocket 100, as such the description will not be repeated with reference to pocket 200.

Referring now generally to the FIGS. 1-8, the instant invention relates to an adjustable rigid pocket 100 for pivotal attachment to an interior sidewall panel 102 of an aircraft. In embodiments, pocket 100 can be positioned adjacent passenger seats. With reference to FIGS. 1, 2, 5 and 8, an interior sidewall panel 102 of an aircraft is provided configured with a pocket 100. It is understood that the inner sidewall panel 102 may not be the fuselage of the aircraft but rather may be a separate material provided inboard the fuselage. In embodiments, pocket 100 includes a pocket shell 104 comprising opposing sidewalls 107, a front wall 109, and a floor 113, which connect therebetween an upper edge 110 and lower edge 112. Sidewalls 107 extend substantially perpendicular to the front wall 109, which in combination, creates space between the interior panel 102 and front wall 109, thus forming the structure/shell 104 of pocket 100. Pocket 100 includes a hinge 103 or a similar moveable attachment device. In embodiments, hinge 103 is positioned along a lower edge 112 of pocket 100. The hinge 103 can, in embodiments, be a piano hinge and pivotally connects the interior wall panel 102 (see FIG. 8) and pocket 100. The pocket 100, which is substantially rigid in embodiments, includes upper edge 110, lower edge 112 and opposed sides 106 and 107, with the floor 113 attached to hinge 103. The sides and floor 113 of shell 104 define an inner pocket area 114. In embodiments, the pocket 100 comprises a front pocket wall 109, having an inner surface 148, and opposing sides 106 and 107 with inner surfaces 118, that extend substantially perpendicular to the front pocket wall 109.

In one embodiment, the pocket shell 104 is substantially planar and defined by the sides 106, 107 and an upper edge 110 opposing a lower edge 112, such as pocket shell 204 and pocket 200. In some embodiments, (pocket 100) flanges 111 extend away from panel 102 and align with each side 106, 107 to substantially create a larger inner pocket area 114 and containment area between the pocket shell 104 and the inner sidewall panel 102 of the aircraft.

Pocket 100, in embodiments, includes a strap assembly 130 which can impart tension to bias pocket 100 to a closed or stowed orientation respective the aircraft sidewall panel 102. The strap assembly 130 is configured to be adjustable such that the amount of tension imparted by the strap assembly 130 can be adjusted. More specifically, a first end of strap assembly 130 attaches to panel 102 and a second end of strap assembly 130 attaches to pocket 100 and is repositionable relative to the front wall 109 to adjust the tension imparted to pocket 100.

Figure 4:
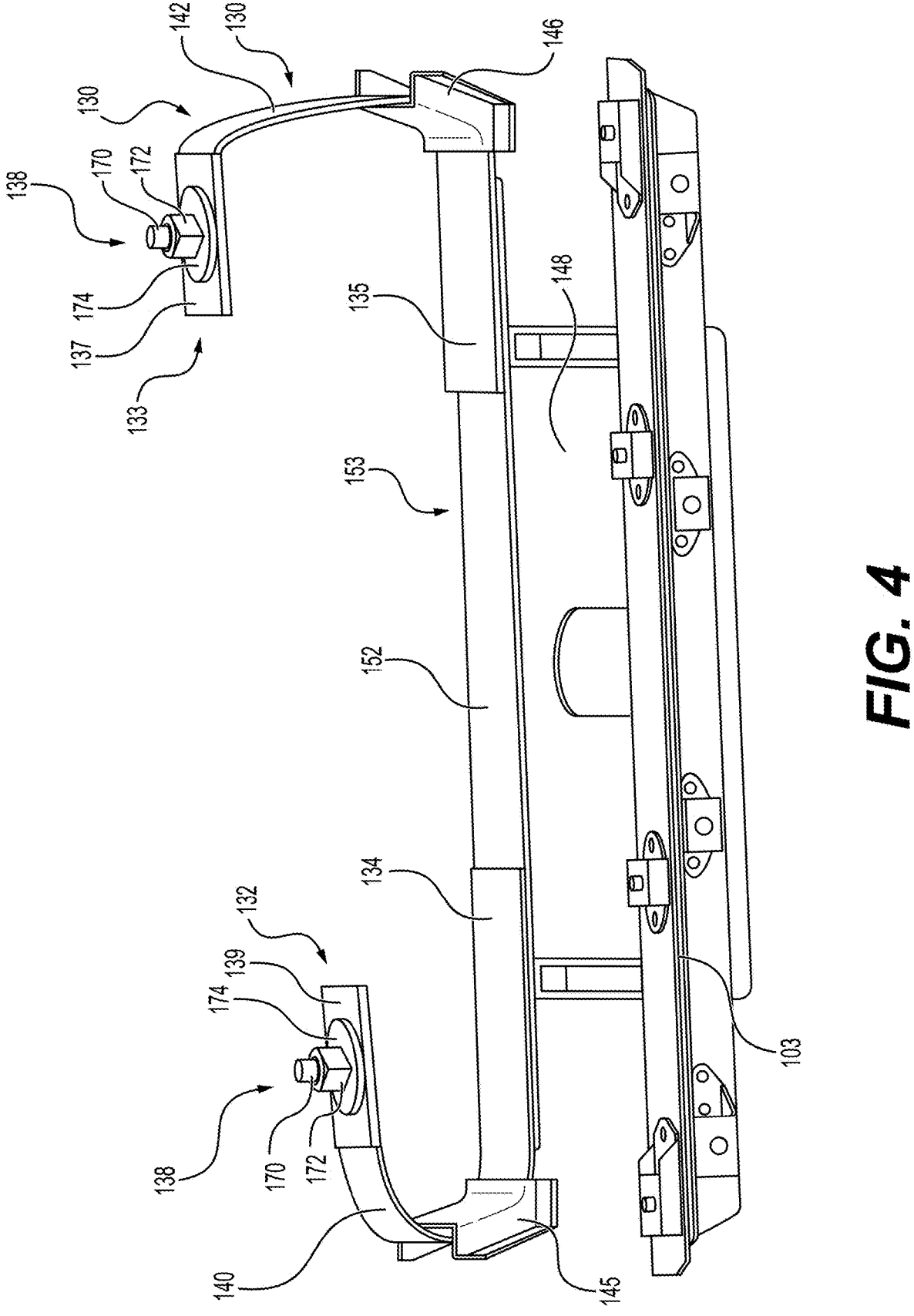
FIG. 4 is a perspective view of a strap assembly of the adjustable pocket with the interior wall and pocket shell removed.
Figure 5:
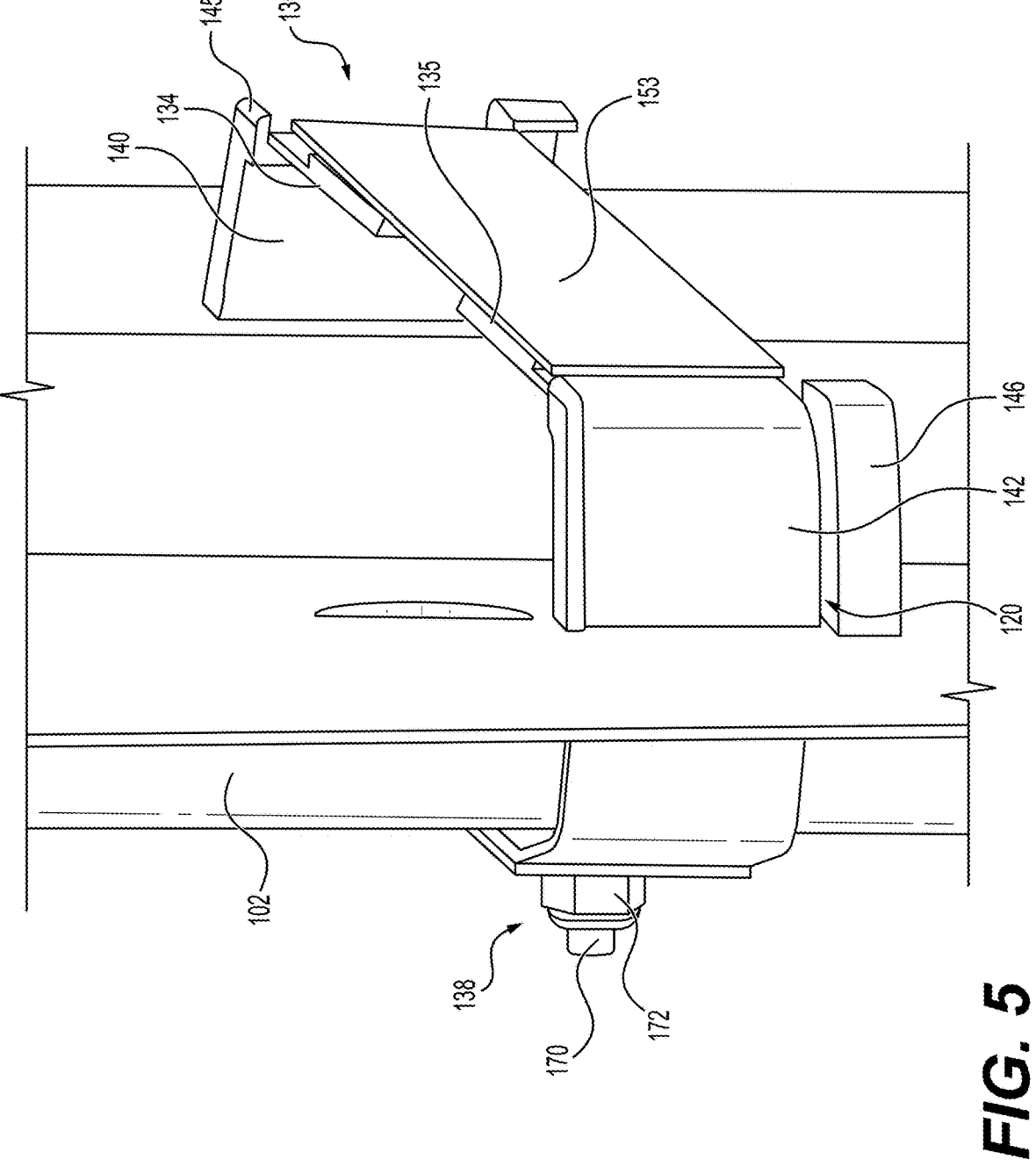
FIG. 5 is a perspective view of the strap assembly of FIG. 4 with the pocket shell removed.
Figure 6:
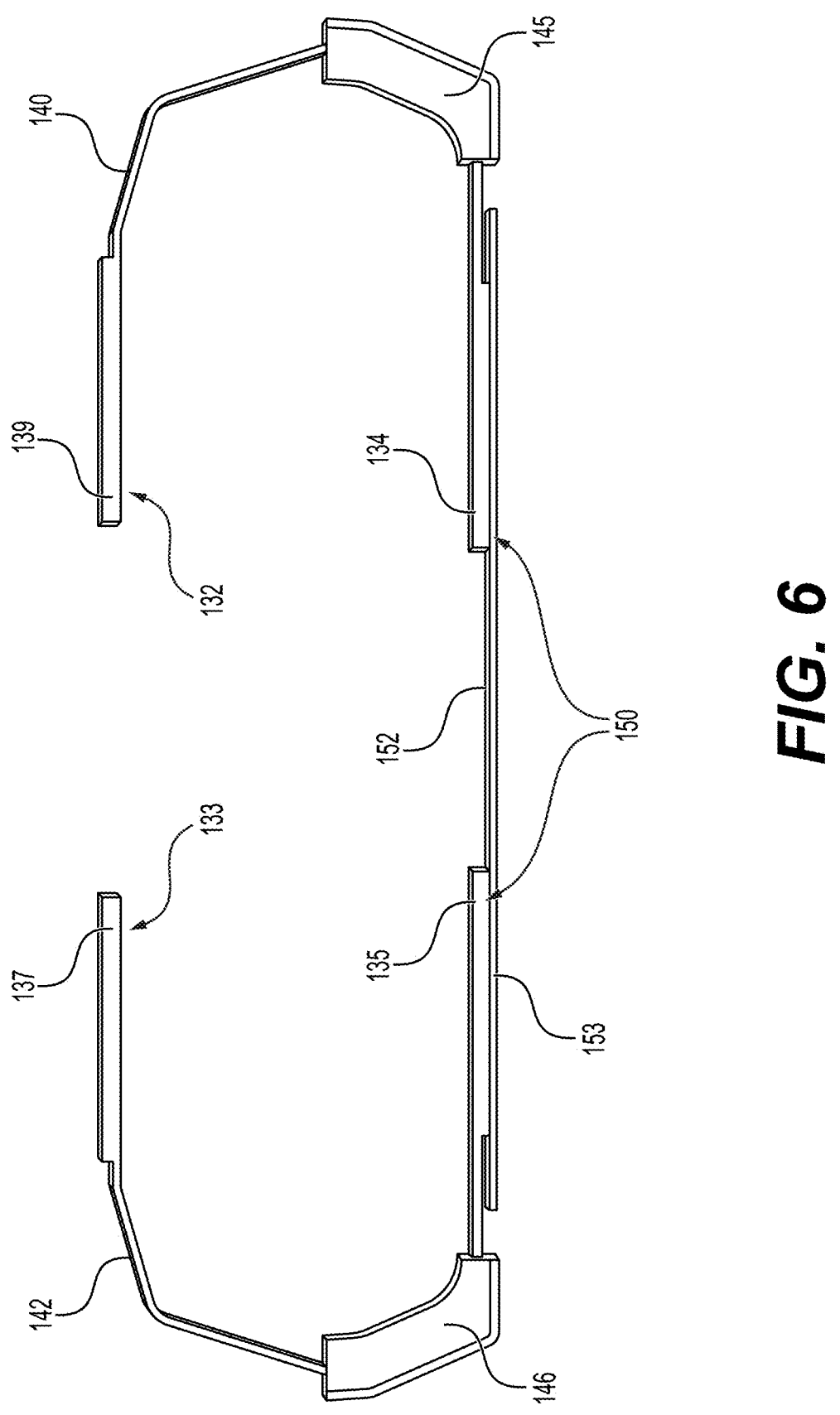
FIG. 6 is a top view of the strap assembly of FIG. 4 with the interior panel and pocket shell removed.

In embodiments, with reference to FIGS. 4-6, strap assembly 130 is provided with two straps 140 and 142 with one such strap positioned at or near each side of pocket 100. While a single strap assembly 130 can be employed, the usage of two straps 140 and 142 allows the pocket 100 to be adjusted from either side with strap 140 and/or 142. The strap assembly 130, in embodiments, includes repositionable fabric fastener straps 140 and 142 configured to pass through guide slots 120 (FIG. 5) formed in the sidewall 102 and corner retainers 145 and 146 positioned within inner pocket area 114 which substantially align and secure the fastener straps 140 and 142 along the upper edge 110 of pocket 100. In some embodiments an outer retainer 105 is configured with front wall 109 and can bolt into the strap assembly 130 and can provide storage for manuals or other documents outside of the pocket shell 104. In embodiments, advantageously, the fastener straps 140 and 142 can be repositioned so that the inner pocket area 114 of pocket 100 can be adjusted, or the pocket 100 fully disengaged from the panel 102. For instance, when the strap assembly 130 is adjusted and the fastener straps 140 and/or 142 repositioned, the storage capacity (i.e. inner pocket area 114) within pocket 100 can be changed when the hinge 103 pivots as a result of the change in imparted tension. When the hinge 103 pivots, the angle of the front wall 109 relative to the panel 102 changes. It may be advantageous to adjust/reposition the strap assembly 130 when the inner pocket area 114 of pocket 100 needs increased to provide space for a large item. It also may be advantageous to remove the pocket 100 from panel 102 to provide easy access for cleaning the pocket 100 interior.

In embodiments, with reference to FIGS. 4 and 6 (with the pocket shell 104 and panel 102 removed), the strap 140 includes a first end 132 and a second end 134, and the strap 142 includes a first end 133 and a second end 135. In embodiments, the first ends of the straps 140 and 142 can each include a thermoplastic acrylic-polyvinyl chloride structure (e.g., Kydex) portions 137 and 139 fastened and fixed at or near either or both of the strap 140 and 142 ends 132 and 133. In embodiments, the Kydex or reinforced portions 137 and 139 provide rigidity to the first ends 132 and 133 of strap assembly 130 for connection and prevents pull-through or tearing of the fabric strap at the connection point (i.e. fastening arrangement 138). At the first ends 132 and 133, the reinforced portions 137 and 139 are fastened and fixed to the fastener straps 140 and 142, in embodiments, by conventional means such as adhesive, sewing, rigid fasteners, or a combination thereof.

The reinforced portions 137 and 139 at first ends 132 and 133 are, in embodiments, apertured to accept a fastening arrangement 138 configured for securing/anchoring each end 132 and 133 to the interior sidewall panel 102. Please note that in FIGS. 3, 4, 6, and 8 sidewall panel 102 has been removed so that details of at the ends 132 and 133 and strap assembly 130 can be seen. Those skilled in the art will recognize that the fastening arrangement 138, in embodiments, includes a bolt 170 and a threaded nut 172 and washer 174 passed onto the bolt 170. Bolts 170 secure the ends 132 and 133 through two spaced apart apertures aligned using washers 174 clamped together by the bolt heads and nuts 172. In embodiments, the fastening arrangement 138 includes a screw, nut, and bolt arrangement, but it is recognized that other types of fastening arrangements may be used in combination with or in place of fastening arrangement 138 in other embodiments. It is understood that attachment of the first ends 132 and 133 of the strap assembly 130 to the sidewall 102 can be accomplished by any mechanical means used within the industry to connect items to airplane sidewalls.

An opening provided through the Kydex reinforced portions 137 and 139 fastened to fabric of the straps can accommodate connection of the straps 140 and 142 to the bolt 170 of fastening arrangement 138 and the panel 102. In embodiments, the first ends 132 and 133 reinforced portions 137 and 139 provide rigidity to the straps 140 and 142 for connection and prevents pull-through or tearing of the fabric straps at the connection point where the bolt 170 is inserted.

Figure 7:
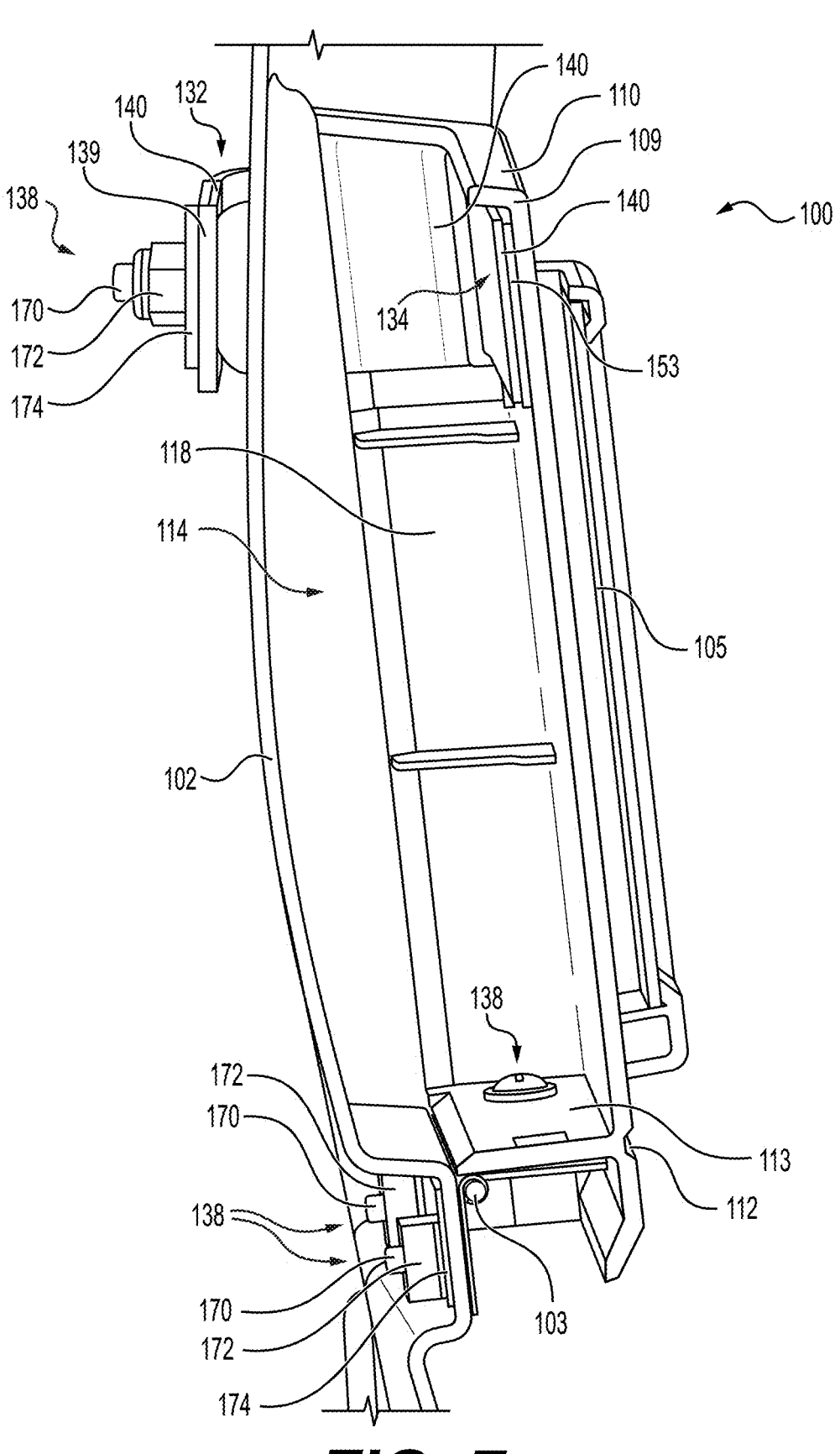
FIG. 7 is a cross-sectional view of the adjustable pocket of FIG. 1.

In embodiments, and with reference to the cross section shown in FIG. 7, the reinforced portion 139 is attached to the surface of strap 140 which faces away from the panel 102. In other embodiments, it may be advantageous to attach the reinforced portion 139 to the surface of the strap 140 which contacts panel 102. The reinforced portion 137 may be configured similarly on strap 142.

Figure 8:
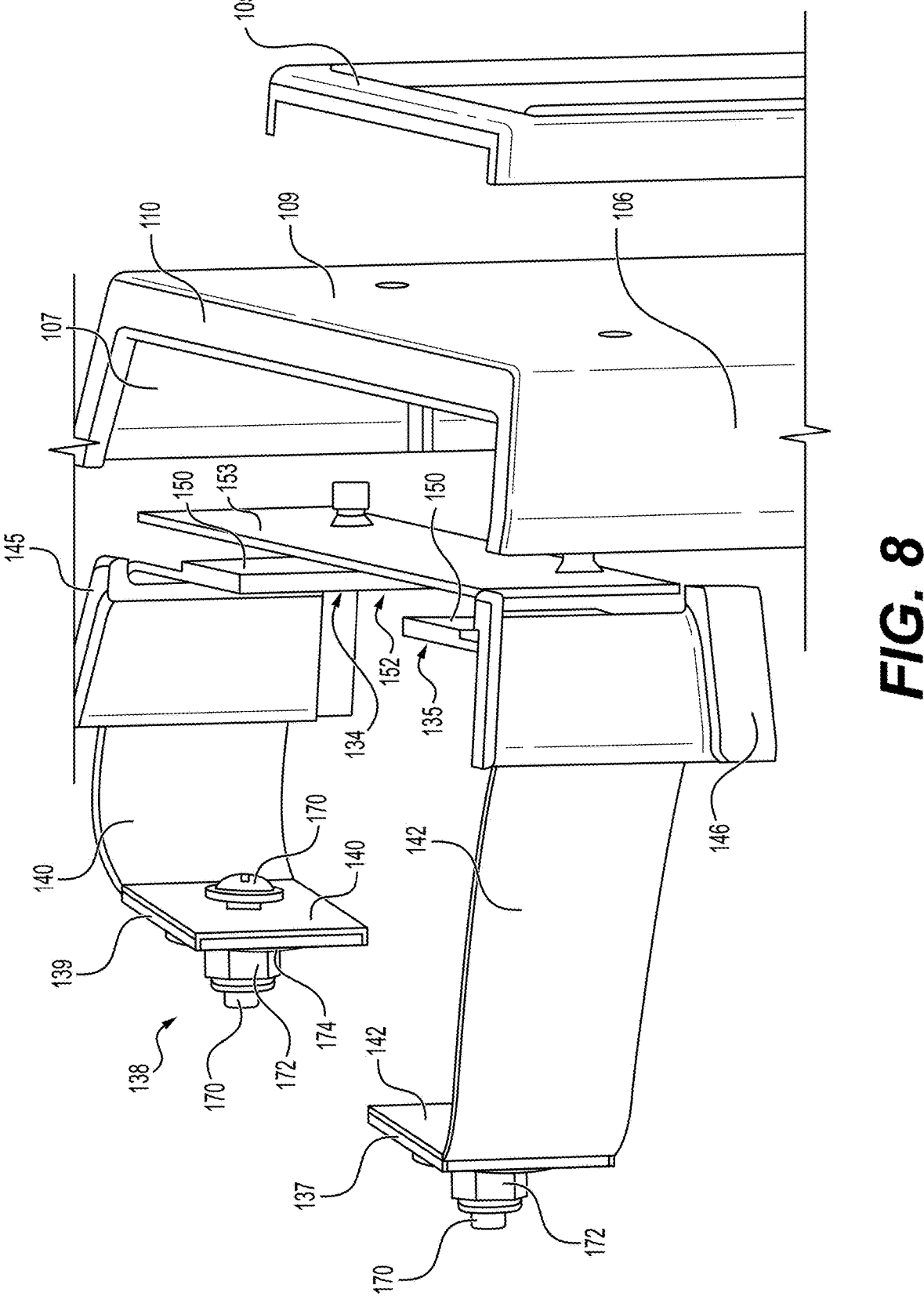
FIG. 8 is an exploded view of the strap assembly of FIG. 4 with the interior panel removed.

With reference to FIG. 8, hinge 103 is fastened to the floor 113 of pocket shell 104 and the panel 102 using fastening arrangement 138 which includes bolt 170, threaded nut 172, and washer 174. It is recognized that hinge 103 can be attached to panel 102 and pocket shell 104 using other fastening techniques. The hinge 103 is configured on the pocket shell 104 and panel 102 to allow adjustability for the angle of the floor 113 relative to the panel 102. For instance, as the floor 113 pivots and rotates downward, the pocket shell 104 and upper edge 110 shift away from the panel 102 which increases the inner pocket area 114. When the floor 113 pivots and rotates upward, the pocket shell 104 and upper edge 110 shift toward panel 102 which decreases inner pocket area 114.

With reference to FIGS. 4-8, the second ends 134 and 135 of the fabric straps 140 and 142 can be fed through guide slots 120 formed in panel 102 and corner retainers 145 and 146 configured within the inside of pocket 100. The interior sidewall panel 102 of the aircraft includes at least one, or in embodiments two, guide slots 120 configured to allow passage therethrough of the strap assembly 130. The first ends 132 and 133 of the strap assembly 130 are connected to an outer side of the panel 102 and the strap 130 is positioned through the guide slots 120 such that the second ends 134 and 135 are oriented inwards and towards the inner surfaces 118 and 148 of pocket 100. The first ends 132 and 133 of strap assembly 130 are bolted to the panel 102 using fastening arrangement 138 and the second ends 134 and 135 pass through the corner retainers 145 and 146 to be aligned with the hook fastening fabric 152 disposed along the upper edge 110 of front wall 109.

Corner retainers 145 and 146 are positioned near the upper edge 110 of pocket 100 and fit into the corners created from the opposing sides 107 and front wall 109. In embodiments, with reference to FIGS. 3 and 4, the corner retainers 145 and 146 each include an upper sidewall and a lower sidewall extending away from a floor disposed in between the upper and lower sidewalls. The upper and lower sidewalls and the floor form a channel therebetween. The channel is configured to receive the second ends 134 and 135 of the straps 140 and 142. The straps 140 and 142 are configured to pass through the channel between the corner retainers 145 and 146 and the front wall 109 and into a respective guide slot 120. In some embodiments, corner retainers 145 and 146 are bonded onto the pocket shell 104 which may be advantageous when the pocket shell 104 is injection molded and not manufactured with the pocket 100. In some embodiments, corner retainers 145 and 146 could be a different material than pocket shell 104 (e.g. metal) and attached with fasteners. In other embodiments, possibly in cases where the pocket 100 is 3D printed, the corner retainers 145 and 146 could be formed with the pocket 100 and pocket shell 104. In embodiments, corner retainers 145 and 146 and the straps 140 and 142 are substantially concealed within the inner pocket area 114 to enhance the aesthetic appeal of pocket 100, but in other embodiments, the straps 140 and 142 could be configured on the outside of pocket 100.

The second ends 134 and 135 include connection means allowing the straps 140 and 142 to be repositionable and removeably secure with a fastening portion 153 attached to inner surface 148 of front wall 109 of pocket 100. In embodiments, a hook and loop fastening system (i.e. Velcro) is disposed on an inward facing face of fastening portion or band 153 and on second ends 134 and 135 of straps 140 and 142. In some embodiments, second ends 134 and 135 may be snuggly fit through the corner retainers 145 and 146. The fastening portion 153 can be disposed on an inner facing surface which includes hook fastening fabric 152 and on an outer facing surface attaches to front wall 109 and outer retainer 105. The outer facing surface of the locking or fastening portion 153 can be fastened to the inside surface of the front wall 109, in embodiments, by conventional means such as adhesive, sewing, rigid fasteners, or a combination thereof.

The hook and loop fastening system substantially secures the straps 140 and 142 to the inner surface of fastening portion 153 disposed on pocket shell 104. More specifically, a looped fastening fabric 150 (see FIGS. 6 and 7) can be disposed onto outer facing surfaces (i.e. the surfaces facing towards the fastening portion 153) of the second ends 134 and 135. A hook fastening fabric 152 can be disposed onto an inner facing surface of fastening portion 153. Fastening portion 153 substantially aligns with the straps 140 and 142 when the pocket 100 is assembled.

Upon an installation, the corner retainers 145 and 146 guide the straps 140 and 142 such that the ends 134 and 135 are turned inward to engage the looped fastening fabric 150 on each with the hook fastening fabric 152 on the fastening portion 153. When joined together, the ends 134 and 135 secured to the fastening portion 153 function as the integrated strap assembly 130. The strap assembly 130, as it is received in the received in the retainers 145 and 146, secures the front wall 109 and opposing sides 106 and 107 of pocket 100. In this way, the hook and loop fastening arrangement allows for the strap assembly 130 to be selectively repositionable and fully removable from the fastening portion 153 mounted to the front wall 109 and pocket shell 104.

The looped fastening fabric 150 and hook fastening fabric 152, in embodiments, may be made from an elastic or stretchable material. Additionally, corner retainers 145 and 146 alter the direction of pull when the front wall 109 is pulled away from panel 102, which may occur when pocket 100 is being opened. For instance, when front wall 109 is pulled directionally away from panel 102, the corner retainers 145 and 146 alter the direction of the pulling force applied such that the looped fastening fabric 150 and hook fastening fabric 152 experience a shear force (i.e. a sliding force parallel with the fabric surfaces). The corner retainers 145 and 146 can be mechanically important to the function of pocket 100 because when attached, looped fastening fabric 150 and hook fastening fabric 152 will substantially remain attached when a shear force is applied, but can be more easily pulled apart when a pulling force (i.e. a force opening the pocket) is applied, putting the overall strap 130 in tension.

The hook and loop connection provided by looped fastening fabric 150 and hook fastening fabric 152 on the second ends 134 and 135 of the strap assembly 130 and fastening portion 153 respectively, allows repositioning and resizing of the strap assembly 130 and substantially allows pocket 100 to be adjustable in terms of pocket expandability and collapsibility due to strap elasticity and flexibility. The size adjustability may allow for the accommodation and containment of different sizes of stored objects within the pocket 100.

The repositioning of the strap assembly 130 further provides adjustability necessitated by fatigue of the strap 140 and 142 fabric which is preferably an elastic material. For instance, as the elasticity of strap assembly 130 degrades over time the hook fastening fabric 152 disposed on each of second ends 134 and 135 can be repositioned on the looped fastening fabric 150 disposed on front wall 109. In embodiments, the repositioning of the hook fastening fabric 152 can impart more tension onto pocket 100 when the second ends 134 and 135 are positioned closer towards one another on hook fastening fabric 152, which pulls more of straps 140 and 142 through the corner retainers 145 and 146 and biases the pocket 100 into a closed position.

When the strap assembly 130 is attached to the pocket shell 104 using the looped fastening fabric 150 and hook fastening fabric 152, the elastic material of the strap assembly 130, when properly adjusted, imparts constant inward pressure on the pocket 100 to substantially bias the pocket to a stowed position. The pocket 100 can be adjusted/biased inboard or outboard respective the aircraft sidewall panel 102 to allow objects to be placed in the inner pocket area 114 and, again, the elastic material of strap assembly 130 biases the pocket into the stowed or closed position thereby retaining the stored object between the pocket 100 and aircraft sidewall panel 102.

Figure 3:
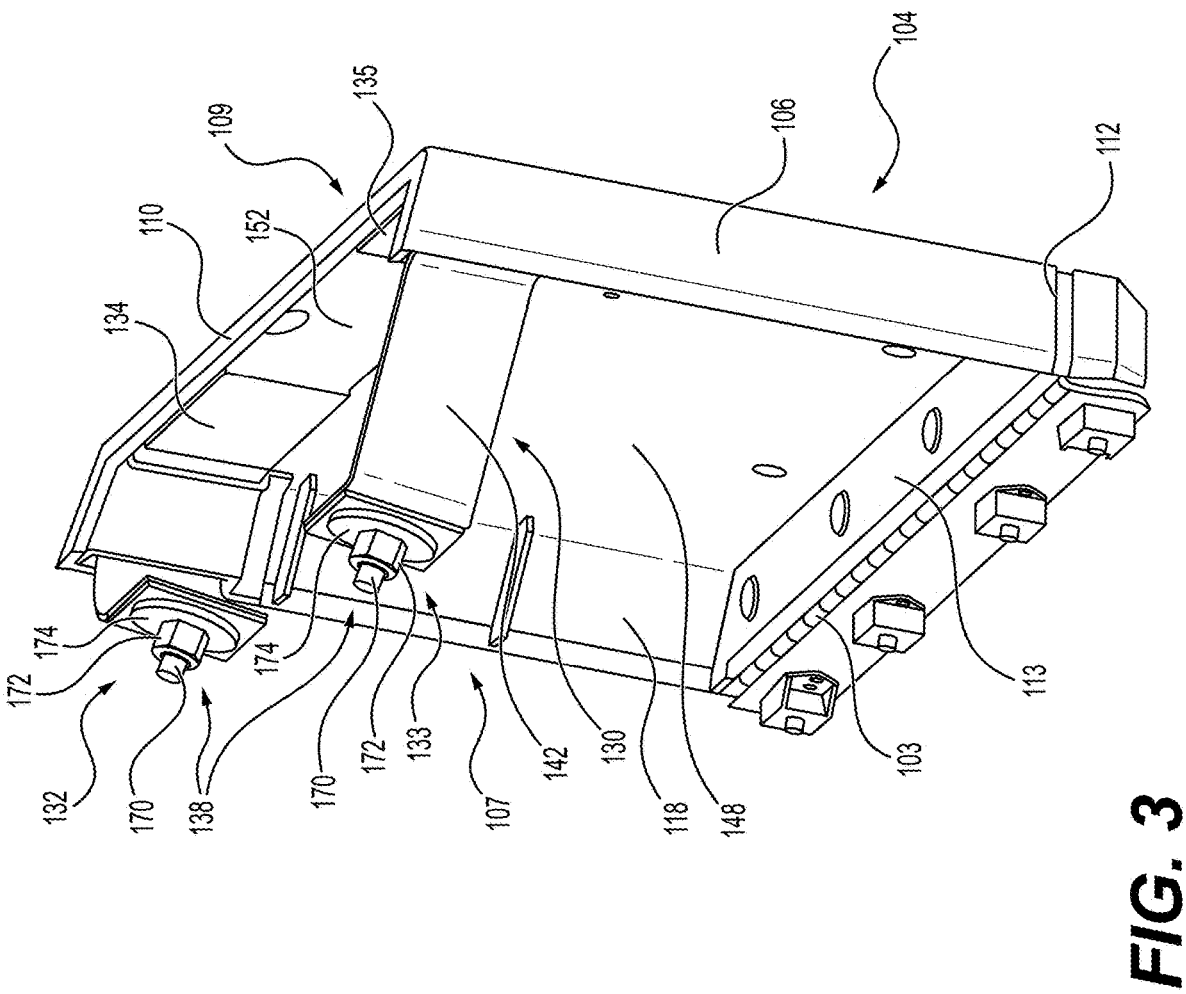
FIG. 3 is a perspective view of the adjustable pocket of FIG. 1 with an interior panel removed revealing an inner space of the adjustable pocket.

As desired, the fastener strap assembly 130 can be repositioned so that larger objects can be placed in the pocket, or fully disengaged for easy access to clean the pocket interior which can be done by pivoting and rotating the pocket 100 and lowering the pocket shell 104 forwardly and downwardly on hinge 103 (see FIGS. 3 and 7). The second ends 134 and 135 of straps 140 and 142 can be repositioned on the looped fastening fabric 150 of front wall 109 such that the tension applied to bias the pocket 100 to the closed position is adjusted. It may be advantageous to adjust the amount of tension applied to pocket 100 when the elasticity of the strap assembly 130 degrades over time, when larger objects need stored in pocket 100 and the size of inner pocket area 114 needs increased.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An adjustable pocket for mounting on an interior panel of an aircraft comprising:

a pocket comprising a rigid shell having upper edges and lower edges, opposing sides, a floor, and a front wall disposed therebetween, wherein the opposing sides are aligned with flanges extending outwards from an interior panel;

a hinge pivotally connecting the lower edge of the pocket to the interior panel; and a strap assembly comprising a first strap having a first end fixed to the interior panel and a second end repositionably attached to the pocket and a second strap having a first end fixed to the interior panel and a second end repositionably attached to the pocket wherein the strap assembly is configured to impart tension and cause the hinge to pivot and the front wall of the rigid shell to be angled relative to the interior panel to bias the pocket into a closed position;

the second end being repositionable such that tension imparted to the pocket is adjustable.

2. The pocket of claim 1 further comprising a reinforced portion fixed to the first end of the strap assembly.

3. The pocket of claim 2 wherein the reinforced portion comprises a thermoplastic acrylic-polyvinyl chloride structure.

4. The pocket of claim 1 wherein the strap assembly comprises stretchable material.

5. The pocket of claim 4 wherein the stretchable material is elastic.

6. The pocket of claim 1 wherein the strap passes through a guide slot formed in the interior panel and the first end is fixed to the interior panel and the second end attaches to the pocket.

7. The pocket of claim 1 wherein the repositioning of the second ends inward towards the center of the front wall shortens the strap assembly and causes the hinge to pivot the floor upwards and bias an upper edge of the front wall towards the interior panel.

8. The pocket of claim 1 further comprising a fastening arrangement to repositionably fasten the second end of the first and second straps to the pocket.

9. The pocket of claim 8 wherein the fastening arrangement comprises a hook and loop fastener.

10. The pocket of claim 8 wherein the fastening arrangement allows the strap assembly to be detachable from the pocket such that the pocket can be expanded or removed from the interior panel.

11. The pocket of claim 1 wherein the pocket comprises corner retainers aligned with guide slots and configured into upper corners of the pocket, the corner retainers comprising:

an upper sidewall and a lower sidewall extending away from the front wall and forming a channel therebetween, wherein the channel is configured to receive either of the first strap or the second strap such that the respective strap passes through the channel between the corner retainer and the front wall and into a respective guide slot.

12. The pocket of claim 1 wherein the strap assembly is concealed within the pocket and attaches to an inner surface of the pocket.

13. An adjustable pocket for mounting on an interior panel of an aircraft comprising:

a pocket shell comprising a rigid front wall and a rigid floor connected to rigid opposing sides, wherein the rigid opposing sides are aligned with flanges extending outward from an interior panel;

a strap having a first end and a second end, wherein the first end is fixed to the interior panel and the second end is repositionably attached to the pocket shell;

the strap being configured to impart tension onto the pocket shell and pivot the rigid floor upwards causing an upper edge of the rigid front wall to pivot towards the interior panel thereby biasing the pocket shell into a closed position, wherein the tension imparted is adjustable when the second end is repositioned.

14. The pocket of claim 13 wherein a first fastening fabric is disposed on the pocket shell and a second fastening fabric is disposed on the strap, and, when joined, the first fastening fabric and second fastening fabric make the strap repositionably secure with the pocket.

15. The pocket of claim 13 wherein the strap passes through a corner retainer and the corner retainer alters the direction of pull when the pocket is biased into an open position.

16. A pocket for an aircraft interior surface, the pocket comprising:

a shell wherein the shell is rigid and includes opposing side walls aligned with flanges extending outward from an aircraft interior surface, a front wall, and a floor, wherein on one side, the flanges are contoured to match up against curvature of the aircraft interior surface and on another side are configured to butt up against the opposed side walls from an upper edge to a lower edge;

a hinge on the aircraft interior surface;

a lower portion of the shell being mounted on the hinge, allowing for rotation of the shell upwardly and inwardly and outwardly and downwardly relative to the interior surface;

an elastic length-adjustable strap system, the length-adjustable strap system being anchored at first opposing ends to different locations into the aircraft interior surface, the length-adjustable strap system being wrapped around an internal containment system included on an inside of the shell, the internal containment system being concealed by the shell, the internal containment system receiving the strap such that the shell is compelled towards the aircraft interior surface.

17. The pocket of claim 16 wherein second opposing ends of the elastic length-adjustable strap system have elasticity and the second opposing ends are connected together by a locking band that spans between the second opposing ends.

18. The pocket of claim 17 wherein the second opposing ends are connected to the locking band and are repositionable on the locking band and the repositioning of the second opposing ends inward towards the center of the locking band shortens the length of the length-adjustable strap system and causes the hinge to pivot the floor upwards and the front wall towards the aircraft interior surface.

19. The pocket of claim 16 wherein the hinge mounts to a floor of the shell and the aircraft interior surface.

* * * * *